US012697579B2

(12) United States Patent
Silva et al.

(10) Patent No.: US 12,697,579 B2
(45) Date of Patent: Aug. 4, 2026

(54) METHOD FOR MANAGING A FAULT IN A PRESSURE SWING ABSORPTION GAS TREATMENT UNIT

(71) Applicant: L'Air Liquide, Société Anonyme pour l'Etude et l'Exploitation des Procédés Georges Claude, Paris (FR)

(72) Inventors: Paulo Silva, Cergy (FR); Christian Monereau, Montpellier (FR); Jan Matthyssen, Kapellen (BE); Pascal Meerman, Rotterdam (NL); Luc Nelis, Vorselaar (BE)

(73) Assignee: L'Air Liquide, Societe Anonyme Pour l'Etude et l'Exploitation des Procedes Claude Georges, Paris (FR)

( * ) Notice: Subject to any disclaimer, the term of this patent is extended or adjusted under 35 U.S.C. 154(b) by 444 days.

(21) Appl. No.: 18/036,080

(22) PCT Filed: Oct. 27, 2021

(86) PCT No.: PCT/EP2021/079867
§ 371 (c)(1),
(2) Date: May 9, 2023

(87) PCT Pub. No.: WO2022/096347
PCT Pub. Date: May 12, 2022

(65) Prior Publication Data
US 2023/0405514 A1      Dec. 21, 2023

(30) Foreign Application Priority Data

Nov. 9, 2020    (FR) ...................................... 2011462

(51) Int. Cl.
| | |
|---|---|
| *B01D 53/047* | (2006.01) |
| *B01D 53/04* | (2006.01) |
| *G05B 19/418* | (2006.01) |

(52) U.S. Cl.
CPC ....... *B01D 53/047* (2013.01); *B01D 53/0446* (2013.01); *G05B 19/4184* (2013.01);
(Continued)

(58) Field of Classification Search
None
See application file for complete search history.

(56) References Cited

U.S. PATENT DOCUMENTS

| | | | |
|---|---|---|---|
| 6,224,651 B1 | 5/2001 | Monereau et al. | |
| 6,447,582 B1 * | 9/2002 | de Souza ............. | B01D 53/047 |
| | | | 96/121 |
| 2003/0167920 A1 | 9/2003 | De-Souza et al. | |

FOREIGN PATENT DOCUMENTS

| | | |
|---|---|---|
| FR | 2 782 020 | 2/2000 |
| FR | 2 835 932 | 8/2003 |

(Continued)

OTHER PUBLICATIONS

FR2865554A1_ENG (Espacenet machine translation of Drouart) (Year: 2005).*

(Continued)

*Primary Examiner* — Gabriel E Gitman
(74) *Attorney, Agent, or Firm* — Allen E. White

(57) ABSTRACT

A method for managing a pressure swing adsorption gas treatment unit, the unit having at least N adsorbers, N being a number greater than or equal to 6. Wherein, when a first group and a second group each comprise at least one operational adsorber and at least one defective adsorber. A method including a) shutting down the unit, b) isolating the defective adsorbers from the unit, c) configuring the connections to swap the instrumentation means of the defective adsorber of the first group with the instrumentation means of the operational adsorber of the second group, so that the first group once again, so far as the control device is concerned, comprises n operational adsorbers, and d) setting the control (Continued)

device so that it controls the unit by running the downgraded cycle, excluding the second group.

6 Claims, 3 Drawing Sheets

(52) U.S. Cl.
CPC .............. *B01D 2259/40003* (2013.01); *B01D 2259/40011* (2013.01); *B01D 2259/4062* (2013.01); *B01D 2259/4068* (2013.01)

(56) References Cited

FOREIGN PATENT DOCUMENTS

| | | | |
|---|---|---|---|
| FR | 2 865 554 | 7/2005 | |
| FR | 2865554 A1 * | 7/2005 | ......... B01D 53/0454 |

OTHER PUBLICATIONS

International Search Report for corresponding PCT/EP2021/079867, Jan. 4, 2022.

* cited by examiner

[Fig. 3]
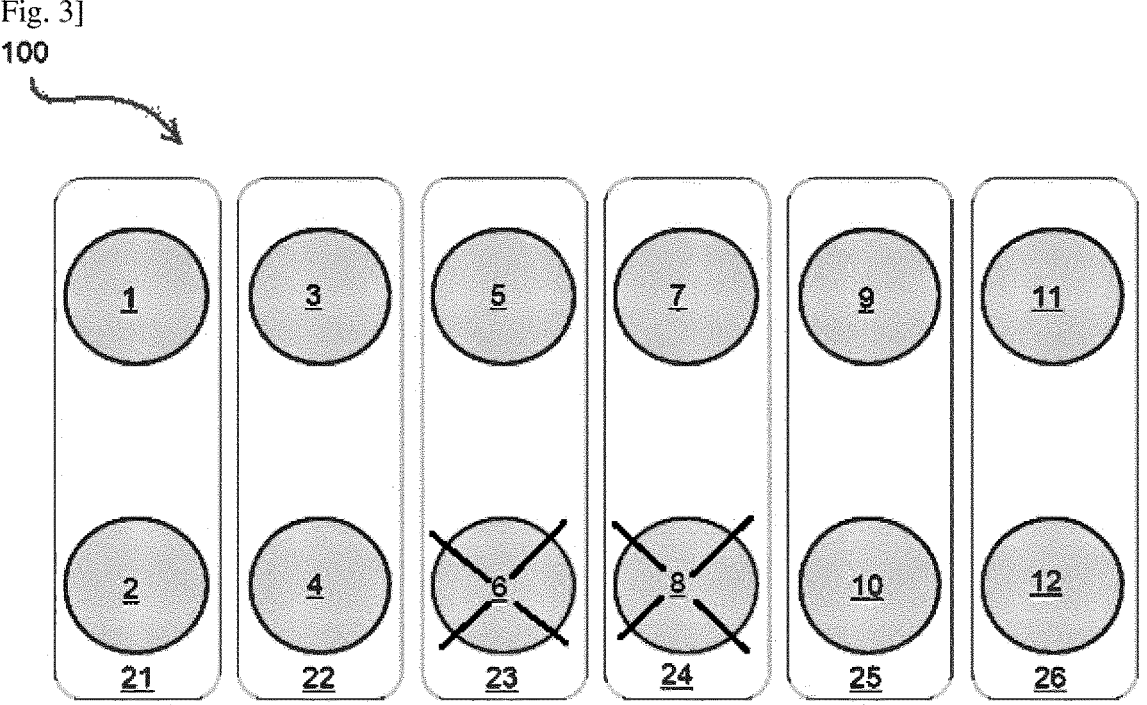
[Fig. 4]
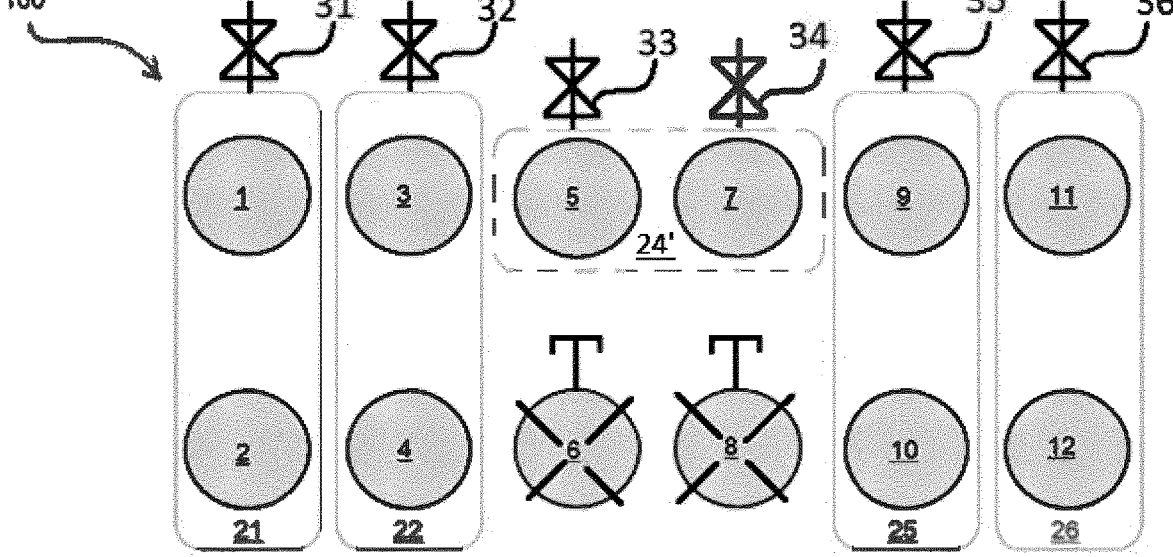

[Fig. 5]
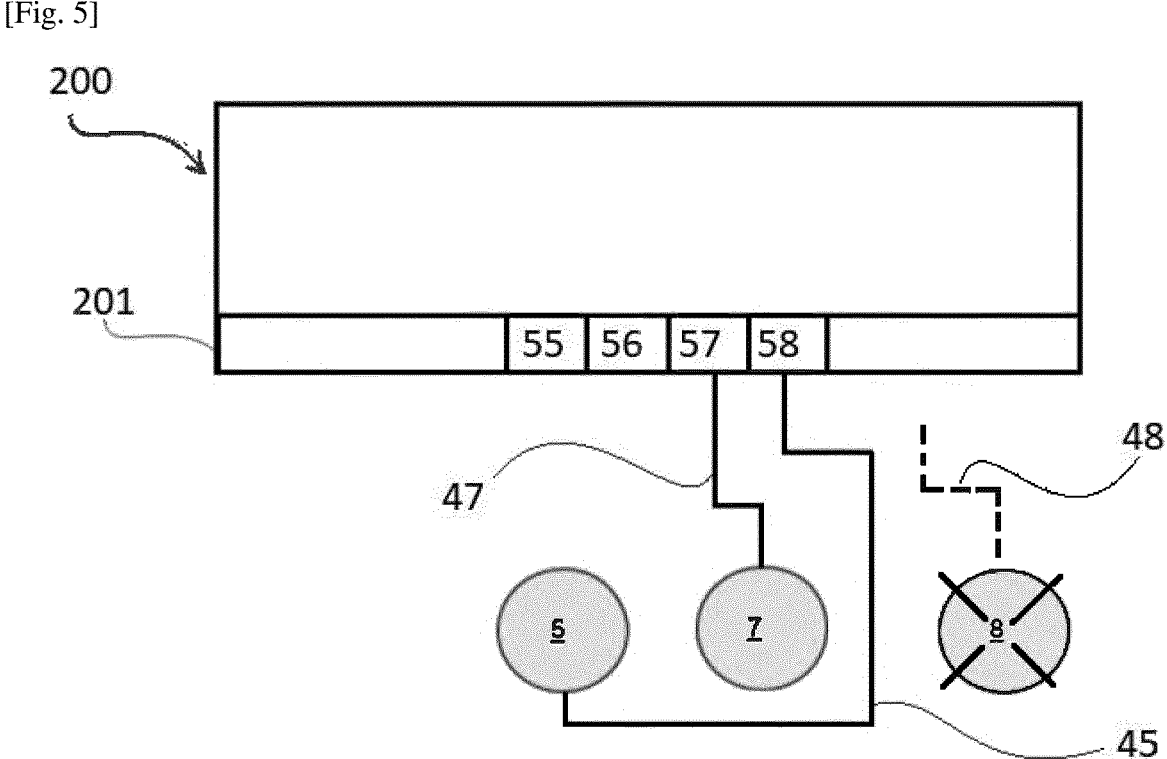

METHOD FOR MANAGING A FAULT IN A PRESSURE SWING ABSORPTION GAS TREATMENT UNIT

CROSS REFERENCE TO RELATED APPLICATIONS

This application is a 371 of International Application No. PCT/EP2021/079867, filed Oct. 27, 2021, which claims priority to French Patent Application No. 2011462, filed Nov. 9, 2020, the entire contents of which are incorporated herein by reference.

BACKGROUND

The present invention relates to a method for managing a unit for treating a gas using Pressure Swing Adsorption (PSA), notably in order to produce an enriched gas stream from a gas feed gas stream, and more particularly to pressure swing adsorption treatment units (PSA units) employing at least 6 adsorbers. It also relates to a unit operating according to this method.

The invention finds a particularly advantageous, although not exclusive, application to H2, O2 or CO2 PSA.

In general, a gas phase adsorption process makes it possible to separate one or more molecules from a gas mixture containing said molecules, by utilizing the difference in affinity of one or more adsorbents for the various constituent molecules of the mixture. The affinity of an adsorbent for a molecule depends partly on the structure and composition of the adsorbent and partly on the properties of the molecule, particularly its size, electron structure and multipole moments. An adsorbent can be, for example, a zeolite, an activated carbon, an optionally doped activated alumina, a silica gel, a carbon molecular sieve, an organometallic structure, an alkaline or alkaline-earth metal oxide or hydroxide, or a porous structure containing preferably a substance capable of reacting reversibly with the molecules, a substance such as amines, physical solvents, metal complexing agents, metal oxides or metal hydroxides, for example.

The most conventional adsorbent materials are in the form of particles (beads, rods, crushed materials, etc.), but such materials also exist in a structured form, such as monoliths, wheels, parallel passage contactors, fabrics, fibers, etc.

There are 3 main families of adsorption processes: sacrificial charge processes, processes referred to as TSA (temperature swing adsorption) processes and lastly PSA (pressure swing adsorption) processes.

In sacrificial-charge processes, a new charge is introduced when the existing charge is saturated with the impurities, or more generally when it is no longer able to provide adequate protection.

In TSA processes, the adsorbent, at the end of use, is regenerated in situ, meaning that the impurities captured are discharged in order that said adsorbent recovers the greater part of its adsorption capabilities and can restart a purification cycle, the main regeneration effect being due to an increase in temperature.

Lastly, in PSA processes, the adsorbent, at the end of the production phase, is regenerated by desorption of the impurities, this being achieved by means of a drop in their partial pressure. This drop in pressure can be obtained by a drop in the total pressure and/or by flushing with a gas devoid of or containing little in the way of impurities.

Pressure swing adsorption processes are used both to eliminate traces of impurities—for example, in levels below one percent in the feed gas—and to separate mixtures containing several tens of percent of different gases. The first case is generally referred to as purification (gas drying, for example) and the second case as separation (producing oxygen or nitrogen from atmospheric air, for example).

In the context of the present invention, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

- VSA processes, in which the adsorption is carried out substantially at atmospheric pressure, preferably between 0.95 and 1.25 bar abs, and the desorption pressure is lower than atmospheric pressure, typically from 50 to 400 mbar abs;
- MPSA or VPSA processes, in which the adsorption is carried out at a high pressure greater than atmospheric pressure, typically between 1.5 and 6 bar abs, and the desorption is carried out at a low pressure lower than atmospheric pressure, generally between 200 and 600 mbar abs;
- PSA processes proper, in which the high pressure is substantially greater than atmospheric pressure, typically between 3 and 50 bar abs, and the low pressure is substantially equal to or greater than atmospheric pressure, generally between 1 and 9 bar abs;
- RPSA (Rapid PSA) processes, for which the duration of the pressure cycle is typically less than a minute;
- URPSA (Ultra Rapid PSA) processes, for which the duration of the pressure cycle is of the order of a maximum of a few seconds.

It should be noted that these various designations are not standardized and that the limits are subject to variation.

An adsorber will thus begin a period of adsorption at the high pressure until it is loaded with the constituent or constituents to be captured and will then be regenerated by depressurization and extraction of the adsorbed compounds, before being restored in order to again begin a new adsorption period. The adsorber has then completed a pressure cycle and the very principle of the PSA process is to link these cycles together one after the other; it is thus a cyclical process. The time that an adsorber takes to return to its initial state is referred to as the cycle time. In principle, each adsorber follows the same cycle with a time shift, which is known as phase time or more simply phase. Hence the relationship: phase time=cycle time/number of adsorbers. It is apparent that the number of phases is equal to the number of adsorbers.

This cycle generally comprises periods of:

- Production or Adsorption, during which the feed gas is introduced via one of the ends of the adsorber, the most adsorbable compounds are adsorbed preferentially and the gas enriched in the least adsorbable compounds (product gas) is extracted via the second end. The adsorption can be carried out at an increasing pressure, at a substantially constant pressure or even at a slightly decreasing pressure;
- Depressurization, during which a portion of the compounds present in the adsorbent and in the free spaces is discharged from the adsorber, which is no longer fed with feed gas, via at least one of its ends. Taking as reference the direction of circulation of the fluid in the adsorption period, it is possible to define co-current, counter-current or simultaneously co-current and counter-current depressurizations.

Elution or Purge, during which a gas enriched with the least adsorbable constituents (purge gas) circulates through the adsorbent bed in order to help in the desorption of the most adsorbable compounds. Purging is generally performed counter-currently;

Repressurization, during which the adsorber is at least partially repressurized before again starting a new Adsorption period. Repressurization can take place counter-currently and/or co-currently;

Dead time, during which the adsorber remains in the same state. These dead times can form an integral part of the cycle, making it possible to synchronize steps between adsorbers, or can form part of a step which has finished before the allotted time. The valves can be closed or remain in the same state, depending on the characteristics of the cycle.

Pressure swing adsorption treatment units (PSA units) comprising a high number N of adsorbers, N being commonly equal to or greater than six but being able to exceed twenty or so. Indeed, the current trend is to handle increasingly high flow rates and it proves to be generally far more advantageous to increase the number of adsorbers than to increase the individual volumes thereof. It will also be appreciated that the higher the number of adsorbers a unit comprises, the higher will be the risk of one of its adsorbers becoming nonoperational.

The word adsorber must be considered here in the broad sense, namely as including the equipment directly associated with it, such as valves or instrumentation. A fault affecting any one of these pieces of equipment (itself, valves, instrumentation) is generally going to render the adsorber nonoperational, meaning that it can no longer be used in the cycle. This risk was taken into consideration when units of the PSA type were first developed.

A first solution was to provide a substitute cycle for the nominal N-adsorber cycle by programming right from the outset a cycle operating on N–1 adsorbers with the possibility of isolating the faulty adsorber from the unit, i.e. in practice by being able to isolate the N adsorbers independently. In fact, upwards of 6 adsorbers, the solution adopted was to split the N adsorbers into isolatable groups of n adsorbers and to provide substitute cycles operating therefore on N-n, possibly N–2n or N–3n, etc., adsorbers. This then was a trade-off between the performance and complexity of the cycles, and the investment required. In general, n=2 has been adopted, meaning that the N adsorbers are grouped 2 by 2 into N/2 pairs. In that case, the number N of adsorbers needs to be an even number and this solution is favored for PSA units comprising 6, 8, 10, 12, 14, 16, etc. adsorbers. The units comprising a number of adsorbers that is a multiple of 3, for example 9, 12, 15, 18, 21, etc. adsorbers, the adsorbers can be grouped in groups of 3 adsorbers each, and for a nominal cycle operating on 21 adsorbers, substitute cycles corresponding to operating on 18, 15 and 12 adsorbers can be provided.

Mention has been made here of splitting the N adsorbers into pairs or triplets, but it is conceivable to go beyond that if, in the future, PSA units containing a very high number of adsorbers are developed. Such could be the case for example with URPSA (Ultra Rapid PSA) comprising a multitude of small-sized adsorbers.

This type of arrangement encourages fluidically isolating a group (for example a pair or a triplet of adsorbers) from the unit when a fault, for example a gas leak, a valve or instrumentation fault, is detected with at least one adsorber of the pair or of the triplet. What is meant by fluidic isolation is, for example, that this adsorber no longer exchanges any stream of material with the rest of the unit, regardless of the step in the pressure cycle. This isolation is generally achieved by means of isolation valves common to the group (for example to the pair or to the triplet).

When a group (for example a pair or a triplet) of adsorbers is fluidically isolated, it is then possible to set the unit (in reality the control device) so that it operates on a reduced number of adsorbers (for example respectively N–2 or N–3). Substitute cycles involving fewer adsorbers than the nominal cycle are preprogrammed in the control device along with the nominal cycle.

It may be noted that, for the most modern units, certain faults may be detected automatically and likewise, the switchover from the nominal cycle to the substitute cycle with a reduced number of adsorbers may be performed automatically.

A problem may arise when another adsorber, belonging to another group (for example to another pair or another triplet) becomes defective.

Isolating this other group entails setting up the unit to operate for example on the basis of N–4 (in the case where the groups are pairs of adsorbers) or N–6 (in the case where the groups are triplets of adsorbers) adsorbers, if such operation is still possible.

The output of this unit is then very greatly reduced.

In instances where such operation (in this case, for example, on N–4 or N–6 adsorbers) is not possible or has not been planned for, the unit must then be shut down.

These situations are unsatisfactory when, in practice, there are still adsorbers in the unit, namely in the two examples considered, one adsorber in each isolated pair, or two adsorbers in each isolated triplet, that are not being used even though they are in perfect working order.

SUMMARY

The present invention seeks to overcome these disadvantages in an effective way by proposing a method for managing a pressure swing adsorption gas treatment unit, the unit comprising:

at least N adsorbers, N being a number greater than or equal to 6, the N adsorbers being arranged in G groups each comprising n=N/G adsorbers, n being an integer greater than or equal to 2, each adsorber comprising an instrumentation means, a control device allowing the unit to operate selectively on an N-adsorber nominal cycle and on a downgraded cycle, the downgraded cycle excluding at least one group by comparison with the nominal cycle, a plurality of connections allowing the control device to access the instrumentation means of each adsorber, characterized in that when a first group and a second group each comprise at least one operational adsorber and at least one defective adsorber and when these first and second groups between the two of them comprise at least n operational adsorbers, said method then comprises the steps of:

a) shutting down the unit, b) fluidically isolating the defective adsorbers from the unit, c) configuring the connections to swap the instrumentation means of the defective adsorber of the first group with the instrumentation means of the operational adsorber of the second group, so that the first group once again, so far as the control device is concerned, comprises n operational adsorbers, d) setting the control device so that it controls the unit by running the downgraded cycle, excluding the second group.

The invention thus makes it possible to optimize the gas production process of a pressure swing adsorption treatment unit when two adsorbers belonging to two distinct groups are defective. For example, when two adsorbers belonging to two distinct pairs are defective, or where at most three adsorbers belonging to two triplets are defective.

According to one embodiment, the instrumentation means is designed for allowing measurement of information relating to a physical quantity and/or for controlling a valve actuator.

According to one embodiment, the method comprises the step e) of placing each adsorber that is participating in the downgraded cycle in fluidic communication with the unit.

According to one embodiment, the unit comprises at least one isolation valve making it possible to selectively achieve the fluidic isolation or the fluidic communication of at least one adsorber with respect to the unit or of at least one group with respect to the unit.

According to one embodiment, the isolation valve comprises a valve for isolating a group with respect to the unit.

According to one embodiment, the isolation valve comprises a valve for isolating an adsorber with respect to the unit.

According to one embodiment, each group is designed to be isolated selectively, so that isolating a group allows the n adsorbers of the group to be simultaneously fluidically isolated with respect to the rest of the unit.

According to one embodiment, the unit comprises a plurality of cycle valves for controlling the pressure cycle of each adsorber, each cycle valve being notably distinct from the isolation valve.

According to one embodiment, the instrumentation means comprises at least a sensor and/or valve fittings.

According to one embodiment, the sensor comprises a pressure and/or differential pressure and/or temperature sensor.

According to one embodiment, the instrumentation means comprises a valve controller.

According to one embodiment, the unit comprises between 6 and 24 adsorbers.

According to one embodiment, the unit is designed to produce molecular hydrogen or carbon dioxide.

The invention further relates to a pressure swing adsorption gas treatment unit, the unit comprising:

at least N adsorbers, N being a number greater than or equal to 6, the N adsorbers being arranged in G groups each comprising n=N/G adsorbers, n being an integer greater than or equal to 2, each adsorber comprising an instrumentation means, a control device allowing the unit to operate selectively on an N-adsorber nominal cycle and on a downgraded cycle, the downgraded cycle excluding at least one group by comparison with the nominal cycle, a plurality of connections allowing the control device to access the instrumentation means of each adsorber, The control device comprising a microprocessor designed to implement steps a) to d) of the method as described hereinabove.

In other words, the microprocessor is designed to implement each of steps a) to d) of the method as described hereinabove.

According to one embodiment, the microprocessor is further designed to implement step e) of the method as described hereinabove.

According to one embodiment, the connections are configured in such a way as to be interchangeable, notably between a defective adsorber of one group and an operational adsorber of another group.

The collection of features described hereinabove can be applied individually or in combination with this last invention.

The invention further relates to a computer program product comprising instructions that cause the unit as described hereinabove to execute steps a) to d) of the method as described hereinabove when the program is executed by the microprocessor.

According to one embodiment, the computer program product comprises instructions that cause the unit as described hereinabove to execute step e) of the method as described hereinabove when the program is executed by the microprocessor.

The invention finally relates to a pressure swing adsorption gas treatment unit, the unit comprising:

at least N adsorbers, N being a number greater than or equal to 6, the N adsorbers being arranged in G groups each comprising n=N/G adsorbers, n being an integer greater than or equal to 2, each adsorber comprising an instrumentation means, a control device allowing the unit to operate selectively on an N-adsorber nominal cycle and on a downgraded cycle, the downgraded cycle excluding at least one group by comparison with the nominal cycle, a plurality of connections allowing the control device to access the instrumentation means of each adsorber, the unit being configured by the control device to run the downgraded cycle, the unit comprising a first group and a second group each comprising at least one operational adsorber and at least one defective adsorber, all of the adsorbers that are participating in the downgraded cycle being in fluidic communication with the unit and all of the defective adsorbers being fluidically isolated from the unit.

According to one embodiment, the connections between a defective adsorber of one group and an operational adsorber of another group are swapped over.

BRIEF DESCRIPTION OF THE DRAWINGS

The invention will be understood better from reading the following description and from studying the accompanying figures. These figures are given only by way of illustration and do not in any way limit the invention. In particular, they describe only the scenario in which the adsorbers of the unit are arranged in groups of two adsorbers (namely in pairs), but the same principle could be applied if the adsorbers were grouped in triplets, quadruplets, etc.

FIG. 1 is a schematic depiction of a PSA unit in which the method according to the invention is implemented;

FIG. 2 is a schematic depiction of the PSA unit of FIG. 1, in which a group is isolated from the unit via its isolation valve;

FIG. 3 is a schematic depiction of the PSA unit of FIG. 2, in which an adsorber of another group is nonoperational;

FIG. 4 is a schematic depiction of the PSA unit of FIG. 3, implementing the method according to the invention.

FIG. 5 is a schematic depiction of the swapping of the connections between an adsorber and the control device to substitute an operational adsorber for a nonoperational adsorber within a pair.

DETAILED DESCRIPTION OF PREFERRED EMBODIMENTS

First of all, the meaning of the terms used to qualify the status of an adsorber and also what is meant by exchanging (or swapping) the instrumentation means between two adsorbers, needs to be specified.

Thus, an adsorber (considered in the broad sense, namely including its equipment, notably the valves and instrumentation means directly attached to it) is said to be operational if its status allows it to be included in the cycle that the unit is performing. An operational adsorber generally participates in the operation of the unit, but it may also be unused or unexploited, in which case it is isolated from the unit. It nevertheless remains available to be incorporated into the unit's cycle if need be.

Conversely, an adsorber will be nonoperational if its status does not allow it to be incorporated into the cycle. It is then qualified as a defective or faulty adsorber.

An adsorber, whether defective or simply unused, will generally be isolated from the rest of the unit. This isolation can be achieved:

by means of an isolation valve relating to the group to which it belongs (in which case the other adsorbers belonging to that same group are also isolated from the unit); or by closing all of its cycle valves; or by employing specific isolation means such as blind flanges, plugs, a ring seal, a manual valve (these specific means are generally employed for a long-term stoppage or when an operator is working on the adsorber).

It will be noted that, if an adsorber is isolated individually, namely using means that are specific to it (cycle valves, specific means), the other adsorbers of its group, if they are operational, can be placed in fluidic communication with the unit and contribute to the cycle if their doing so is beneficial, provided that the isolation valve relating to the group concerned is open.

In certain cases, it may be that each of the adsorbers of a group has its own isolation valve which will then generally take the place of the isolation valve for the group. Thus, the isolation valves for each adsorber can be controlled simultaneously and in that case perform the same function as an isolation valve for a group of adsorbers.

Thus, an isolation valve that isolates a group of adsorbers or an isolation valve that isolates one adsorber in particular is referred to as an isolation valve. Such an isolation valve is distinct from a cycle valve.

Regarding the swapping of the instrumentation means, the terms employed are general given the diversity of possible connections between the local instrumentation associated with an adsorber and in the immediate vicinity thereof, and the control device which is situated in a control room, or at the very least some distance away, which processes the information. A nonlimiting example of a connection is described hereinafter.

It is known that a sensor measures a physical quantity (pressure, temperature, flow rate, etc.) and that its transducer translates this into an exploitable quantity, often an analog signal that can pass along electrical wires (also known as "instrument cable"). These wires arrive at the terminals of local junction units close to the site equipment, which group together the connections coming from various sensors. Leading out from these local junction units is a multistrand instrumentation cable which groups all of the incoming information, for example that from a dozen sensors. These instrumentation cables, the number of which is dependent on the complexity of the unit, pass along a cable race to the equipment room of the control room and more specifically to the PSA cabinet. There, the wires relating to the various sensors are separated out and fixed to the terminals in the cabinet. These terminals are also connected to the input/output boards which convert the signals hitherto assumed to be analog into the digital signals used by the control device.

Regarding the cycle valves, it is generally the valve actuator that receives the information from the control device and will operate the actuator which itself moves the valve shutter via a mechanical system (stem, gearing, etc.). In return, it may transmit back to the control device the position of the valve, alarms, end-of-travel information, etc.

The term "instrumentation means" covers, for example, the system transmitting information between the site and the control room, whether sensors or regulating valves.

The local junction units may group together wires coming from sensors of the same type, for example all the pressure sensors or the wires concerned with the valves. All of the information relating to an adsorber may also be grouped together. These junction units may be separate or grouped together on one or more distribution boards.

It will be appreciated that the swapping-over of an instrumentation means between two adsorbers can be performed at various points on the information-relaying circuit: at the local terminal, the terminals of the technical cabinet, the input/output boards, the connection to the control device.

The final choice is dependent on the configuration of each system. It will be noted that grouping information together by adsorber may make this swap-over easier.

The most widespread scenario of analog connections has been briefly described hereinabove. The signals may also be transmitted digitally or using wireless networks. It is still possible to swap the signals from two adsorbers by adapting the procedure to suit the technology employed.

In all cases, the result will be that the control device, will, in its program, receive information from a given adsorber (which in reality is nonoperational) and will transmit commands and instructions to that adsorber when in practice what it is controlling is another adsorber of the unit.

Figures 1, 2:
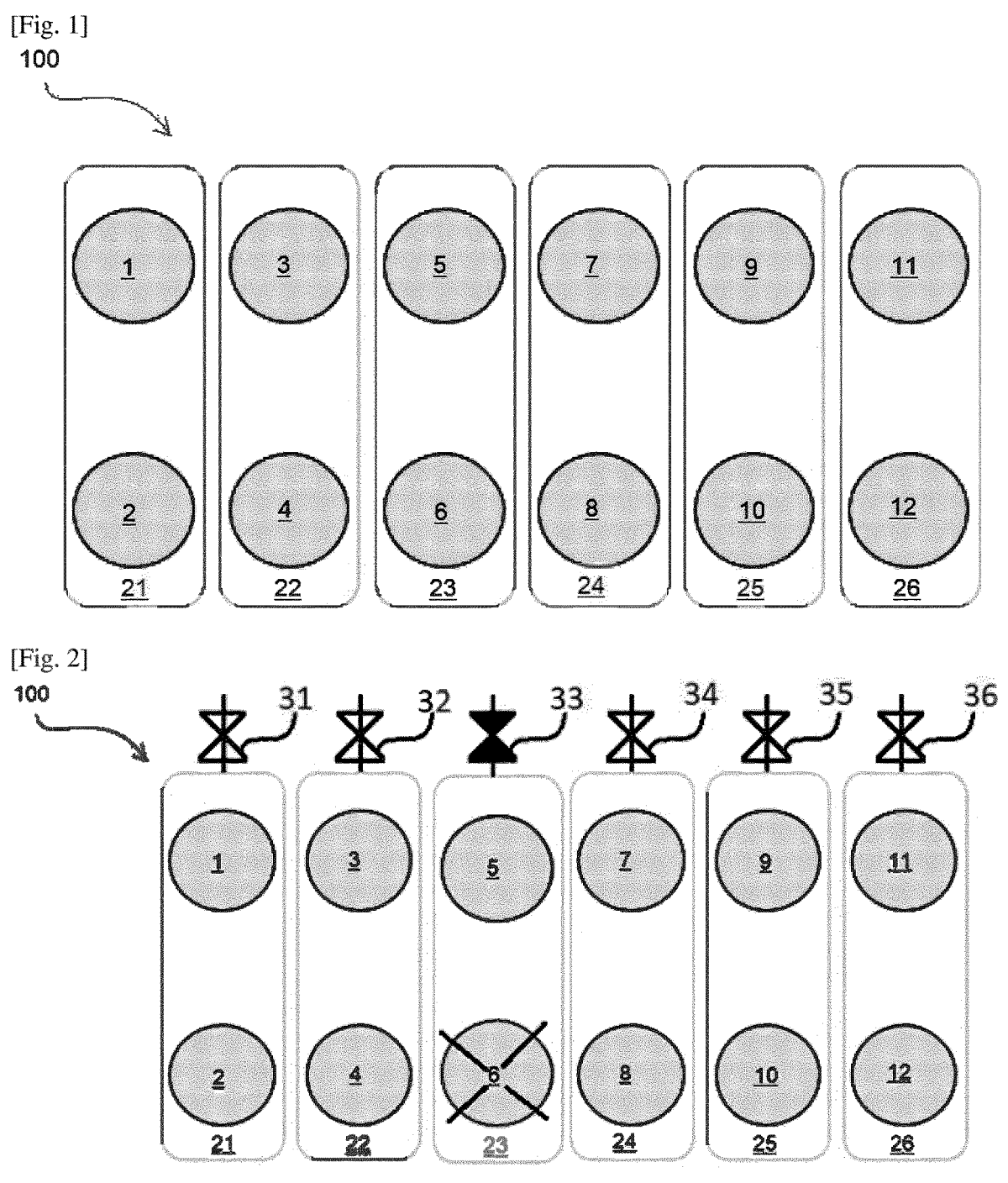

Reference is made to FIG. 1 which depicts a PSA unit 100 employing N=12 adsorbers 1-12. This PSA unit 100 is configured in such a way as to comprise 6 groups (in this instance pairs) 21-26 of adsorbers (the pair 21 comprising the adsorbers 1 and 2, the pair 22 comprising the adsorbers 3 and 4, etc.). Each pair 21-26 of the PSA unit 100 is designed to be selectively isolated, so that the isolating of a pair 21-26 allows the two adsorbers of the pair to be fluidically isolated with respect to the unit 100. More specifically, each pair 21-26 can be isolated from the rest of the unit 100 by an isolation valve, 31-36. In the example depicted, each isolation valve 31-36 is an isolation valve for isolating the group with respect to the unit, which means to say that it allows all of the adsorbers of the group to be isolated from the unit.

Electing to group the adsorbers 1-12 together in groups (in this instance pairs) 21-26 for isolating at least one adsorber 1-12 from the unit represents, as has been explained, a trade-off between the operational flexibility and the complexity of the technical installations of the PSA unit 100.

The unit 100 further comprises a plurality of cycle valves and a control device 200 for controlling the cycle valves, in order to carry out the pressure cycle. Each adsorber 1-12 is thus controlled by cycle valves assigned to it.

The unit 100 further comprises a plurality of connections 45, 47, 48 for accessing instrumentation means of each adsorber 1-12.

More specifically, these connections 45, 47, 48, comprise electric cables, connecting the instrumentation means of each adsorber 1-12 to the control device 200.

The instrumentation means comprise for example pressure sensors and cycle valve switching devices. What is meant here by switching devices is any means specific to a valve that allows it to be commanded and controlled during each step of the cycle.

Thus, the control device 200 is able to read the information delivered by the sensors and control the cycle valves of each adsorber 1-12.

FIG. 2 depicts the same unit as that of FIG. 1, but operating on a cycle employing just 10 adsorbers, the pair 23 having been taken off-line following malfunctioning of the adsorber 6.

This type of operation is planned for right from the design of the unit and the switchover from 12 to 10 adsorbers has been able to be performed automatically. The adsorbers 5 and 6 find themselves isolated from the rest of the unit 100 because the group made up of these two adsorbers 5 and 6 has been isolated via a group isolation valve. As an alternative, isolation can be performed via the isolation valves specific to each adsorber.

The isolation valves 31-36 enabling each of the groups (in this instance each of the pairs) 21-26 to be isolated respectively have been depicted symbolically. In FIG. 2, the isolation valve 33 is closed and isolates the adsorbers 5 and 6 from the unit.

While operating in this configuration, a second adsorber (namely the adsorber 8 of the pair 24 in the example depicted in FIG. 3) develops a fault. This new situation is depicted in FIG. 3. If the unit has not been designed to operate with two groups fewer (in this instance two pairs fewer), either the PSA unit detects the fault and automatically shuts down, or the PSA unit has to be manually shut down.

If, on the other hand, the unit has been designed to operate with just 8 adsorbers, it may operate on this last cycle, but with very greatly downgraded performance.

None of these solutions is satisfactory, especially if returning at least one of the two nonoperational adsorbers to an operational status requires a lengthy intervention time.

The method according to the invention will therefore consist in swapping the instrumentation means of the defective adsorber 8 with those of the operational adsorber 5 at the control device 200 in order to form a new operational pair 24. The control device 200 will therefore in practice be controlling the adsorber 5 in place of the adsorber 8 without the need to make changes to the programming of the cycles or to physically reconfigure any piping. In other words, the control device 200, thinking that it is controlling the adsorber 8 will in actual fact be controlling the adsorber 5.

FIG. 4 symbolizes this new configuration in which the pair '24' still exists so far as the control device 200 is concerned, but now comprises the adsorber 5 in place of the adsorber 8.

FIG. 5 schematically depicts the control device 200, the connections 45, 47, 48 between, respectively, the adsorbers 5, 7, 8 and the corresponding inputs/outputs 55, 57, 58 situated on one of the faces 201 of the control device 200.

The inputs/outputs 55, 56 correspond to the pair 23, whereas the inputs/outputs 57, 58 correspond to the pair 24. By disconnecting the connection 48 and replacing it with the connection 45, the control device 200 will control the pressure cycle of the adsorber 5 which has been interchanged with the adsorber 8, in the same way as it had been controlling the adsorber 8.

The connection 48 could possibly be connected to the input/output 55, but because the pair 23 has been excluded from the cycle, this will have no corresponding effect.

It has been assumed here that the connections are made using electrical cables. They could equally be made using optical fibers or radio links, such as for example Wi-Fi, Bluetooth or equivalent connections. Whatever the type of connection, the objective is to form a new group (the pair '24'. in the example of FIG. 5) that can be controlled by the control device 200 without the need to alter the programming of the control device 200 or the piping. Instead, the inputs/outputs (48 in the example of FIG. 5) normally assigned to a defective adsorber (8 in the example of FIG. 5) are used for another functional adsorber of the unit 100 (5 in the example of FIG. 5).

This isolation is done with due regard to the specific safety regulations on site, dependent on the pressures involved and on the components present in the adsorbers.

Ring seals, blind flanges or plugs may be employed.

The isolated adsorbers can be depressurized, flushed or inerted as appropriate.

Recommissioning itself may involve pressurizing steps prior to the switchover to automatic operation. It may therefore be necessary beforehand to force open the isolation valves 33 and 34 of the pairs 23 and 24 respectively.

The method recommended here entails making changes to the instrumentation connection involving, for example, depending on the PSA unit, two to five valves, or one or two pressure or differential-pressure sensors, or else one temperature sensor.

Finally, it will be noted that the arranging of the adsorbers in groups, is an arrangement that is both physical and logical. Thus, for example, two adsorbers of a particular group will have their input/output piping connected to specific manifolds and these manifolds will have their own isolation valves. The control device is, for its part, able to control two adsorbers of a given group and to distinguish one group from the other groups of adsorbers.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for managing a pressure swing adsorption gas treatment unit, the unit comprising:

at least N adsorbers, N being a number greater than or equal to 6, the N adsorbers being arranged in G groups each comprising n=N/G adsorbers, n being an integer greater than or equal to 2, each adsorber comprising an instrumentation means, a control device allowing the unit to operate selectively on an N-adsorber nominal cycle and on a downgraded cycle, the downgraded cycle excluding at least one group by comparison with the nominal cycle, a plurality of connections allowing the control device to access the instrumentation means of each adsorber, wherein, after a period of operation of the unit in the normal cycle, and when a first group and a second group each comprise at least one operational adsorber and at least one defective adsorber and when the first and second groups combined comprise at least n operational adsorbers, the method comprises:

a) shutting down the unit, b) fluidically isolating the defective adsorbers from the rest of the unit, c) configuring the connections to swap the instrumentation means of a defective adsorber of the at least one defective adsorber of the first group with the instrumentation means of an operation al adsorber of the at least one operational adsorber of the second group, so that the first group once again, so far as the control device is concerned, comprises n operational adsorbers, d) setting the control device so that it controls the unit by running the downgraded cycle, excluding the defective adsorbers.

2. The method according to claim 1, further comprising:

e) placing each adsorber that is participating in the downgraded cycle in fluidic communication with the rest of the unit.

3. The method as claimed in claim 1, the unit comprising at least one isolation valve configured to selectively achieve the fluidic isolation or fluidic communication of at least one adsorber with respect to the rest of the unit or of at least one group with respect to the rest of the unit.

4. The method as claimed in the claim 3, the unit comprising a plurality of cycle valves for controlling the pressure cycle of each adsorber, each cycle valve being distinct from the isolation valve.

5. A pressure swing adsorption gas treatment unit, the unit comprising:

at least N adsorbers, N being a number greater than or equal to 6, the N adsorbers being arranged in G groups each comprising n=N/G adsorbers, n being an integer greater than or equal to 2, each adsorber comprising an instrumentation means, a control device allowing the unit to operate selectively on an N-adsorber nominal cycle and on a downgraded cycle, the downgraded cycle excluding at least one group by comparison with the nominal cycle, a plurality of connections allowing the control device to access the instrumentation means of each adsorber, the control device comprising a microprocessor designed to implement the steps of the method as claimed in one of the preceding claims.

6. The unit as claimed in claim 5, wherein the connections are configured in such a way as to be interchangeable.

* * * * *